United States Patent
Morikami et al.

(10) Patent No.: US 9,579,841 B2
(45) Date of Patent: Feb. 28, 2017

(54) BLOW MOLDING DEVICE

(71) Applicants: Shigeki Morikami, Tokyo (JP); Nobuyuki Tamura, Tokyo (JP); Sumito Sato, Tokyo (JP)

(72) Inventors: Shigeki Morikami, Tokyo (JP); Nobuyuki Tamura, Tokyo (JP); Sumito Sato, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 14/758,394

(22) PCT Filed: Dec. 4, 2013

(86) PCT No.: PCT/JP2013/007133
§ 371 (c)(1),
(2) Date: Jun. 29, 2015

(87) PCT Pub. No.: WO2014/103188
PCT Pub. Date: Jul. 3, 2014

(65) Prior Publication Data
US 2015/0328824 A1    Nov. 19, 2015

(30) Foreign Application Priority Data

Dec. 28, 2012  (JP) .................................. 2012-287493

(51) Int. Cl.
*B29C 49/46*    (2006.01)
*B29C 49/58*    (2006.01)
(Continued)

(52) U.S. Cl.
CPC .............. *B29C 49/58* (2013.01); *B29C 49/12* (2013.01); *B29C 49/46* (2013.01); *B29D 22/003* (2013.01);
(Continued)

(58) Field of Classification Search
CPC .... B29C 2049/4664; B29C 2049/4655; B29C 2049/5893; B29C 2049/5803
See application file for complete search history.

(56) References Cited

U.S. PATENT DOCUMENTS 4,552,527 A * 11/1985 Hunter .................... B29C 49/58
141/311 R
7,165,956 B2 * 1/2007 Santais .................... B29C 49/58
425/3

(Continued)

FOREIGN PATENT DOCUMENTS

JP    H11-138619 A    5/1999
JP    2000-043129 A    2/2000
(Continued)

OTHER PUBLICATIONS

Jun. 30, 2015 Office Action issued in Japanese Patent Application No. 2012-287493.

(Continued)

*Primary Examiner* — Robert B Davis
(74) *Attorney, Agent, or Firm* — Oliff PLC (57) ABSTRACT

A blow molding device, having: a mold; a blow nozzle tightly communicating with a mouth tubular part of a preform when the preform fitted in the mold; and a stretch rod, the blow molding device imparting shape to a container by longitudinally stretching the preform by means of the stretch rod and stretching the preform into an expanded shape by means of a pressurized liquid fed, via the blow nozzle, from a pressurized liquid feeding part separately provided, in which the blow nozzle has a support part for supporting the posture of the stretch rod, and a filling head part communicating with the mouth tubular part of the preform, the filling head part having a feed channel formed therein in the axial direction; and the support part and the (Continued)

filling head part are configured to be detachably coupled to each other in the vertical direction.

5 Claims, 8 Drawing Sheets

(51) Int. Cl.
  *B29D 22/00* (2006.01)
  *B29C 49/12* (2006.01)
  *B29L 31/00* (2006.01)
  *B29C 49/06* (2006.01)
  *B29C 49/42* (2006.01)

(52) U.S. Cl.
  CPC .......... *B29C 49/06* (2013.01); *B29C 49/4289* (2013.01); *B29C 2049/4602* (2013.01); *B29C 2049/465* (2013.01); *B29C 2049/4664* (2013.01); *B29C 2049/5803* (2013.01); *B29C 2049/5858* (2013.01); *B29C 2049/5893* (2013.01); *B29L 2031/712* (2013.01); *B29L 2031/7158* (2013.01)

(56) References Cited

U.S. PATENT DOCUMENTS

| | | | |
|---|---|---|---|
| 9,180,621 B2 * | 11/2015 | Sato | B29C 49/06 |
| 2008/0124424 A1 * | 5/2008 | Mie | B29C 49/58 |
| | | | 425/535 |
| 2010/0176540 A1 * | 7/2010 | Sperka | B29C 49/58 |
| | | | 264/523 |
| 2011/0268855 A1 | 11/2011 | Chauvin et al. | |
| 2012/0093965 A1 | 4/2012 | Lisch et al. | |
| 2012/0207872 A1 * | 8/2012 | Lisch | B29C 49/12 |
| | | | 425/524 |

FOREIGN PATENT DOCUMENTS

| | | |
|---|---|---|
| JP | 2011-526852 A | 10/2011 |
| JP | 2013-132861 A | 7/2013 |
| WO | 2012/051368 A2 | 4/2012 |
| WO | 2012/104018 A1 | 8/2012 |

OTHER PUBLICATIONS

Jun. 30, 2015 International Preliminary Report on Patentability issued in Japanese Patent Application No. PCT/JP2013/007133.

Mar. 11, 2014 International Search Report issued in International Patent Application No. PCT/JP2013/007133.

May 10, 2016 Office Action issued in Japanese Patent Application No. 2015-162029.

Mar. 28, 2016 Office Action issued in Chinese Patent Application No. 201380068200.4.

Aug. 23, 2016 Office Action issued in Chinese Patent Application No. 201380068200.4.

Aug. 31, 2016 Search Report issued in European patent application No. 13867189.6.

* cited by examiner

BLOW MOLDING DEVICE

TECHNICAL FIELD

This disclosure relates to a synthetic resin preform blow molding device that uses a liquid as a pressurized medium.

BACKGROUND

Blow molded bottles made of polyethylene terephthalate (PET) resin (so-called plastic bottles) exhibit many excellent characteristics, and therefore are widely used in many different fields as bottle type containers. These types of containers are typically formed by injection molding a preform into a bottomed cylindrical shape, heating the preform to a temperature at which an expansion effect can be effected, and longitudinally stretching the preform by means of the stretch rod while blowing pressurized air, that is, by means of air blow, into the preform so as to stretch and deform the preform into an expanded shape.

Meanwhile, Patent Literature 1 illustrates an invention relating to a method of blow molding a preform using a liquid instead of air, as the pressurized medium. The molding method of this type may use, as the liquid, beverages, cosmetics, detergent, chemicals or the like, which are to be eventually filled as a content liquid into the final product, to thereby eliminate the filling process, which simplifies the production line.

Figure 8:
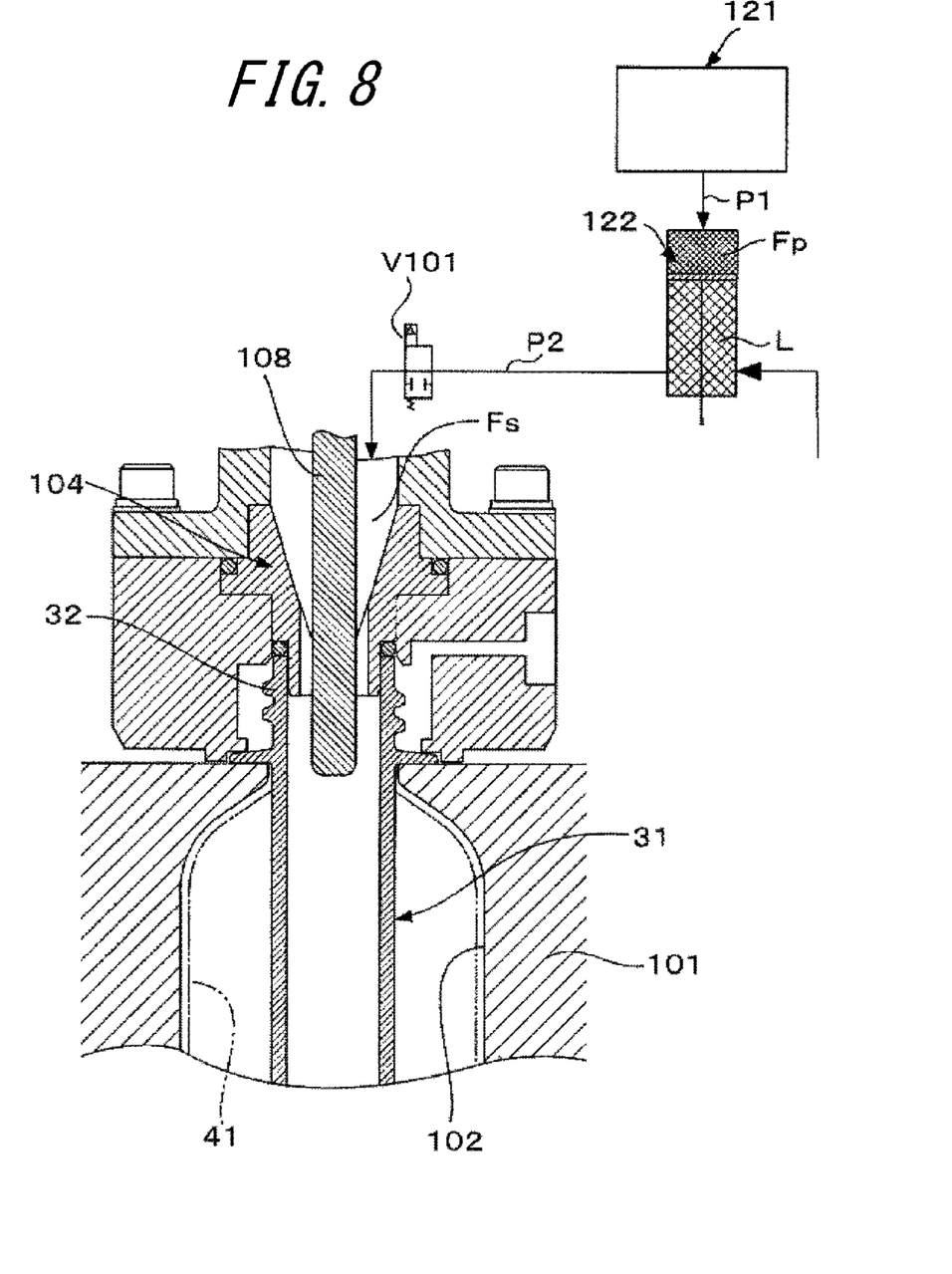
FIG. 8 is an explanatory diagram illustrating a conventional example of the molding device which uses a pressurized liquid.

FIG. 8 is a schematic illustration of a conventional blow molding device for blow molding preforms using a liquid instead of air as the pressurized medium. The main part of this device includes a mold 101 and a blow nozzle 104, and disposed adjacent thereto as annex for feeding the pressurized medium are a pressurized liquid feeding part 122 and a liquid circulating part.

The pressurized liquid feeding part 122 is in the form of a plunger pump, which operates by using, as a power source, a pressurized medium Fp fed via piping P1 from a pressurizing device 121 such as a pressure pump or a compressor, and feeds a pressurized liquid L into the preform 31 having a mouth tubular part 32 tightly fitted onto the tip end portion of the blow nozzle 104, through a feed channel Fs in the interior of the blow nozzle 104 via piping P2 and a magnetic valve V101, so as to form the container 41 by imparting shape to the preform 31 along the shape of the cavity 102 of the mold 101, through longitudinal stretching by means of the stretch rod 108 and stretching into an expanded shape by means of the pressurized liquid L.

CITATION LIST

Patent Literature

PTL 1: JP 2000-43129 A

SUMMARY

Technical Problem

Here, in a device using a liquid as the pressurized medium as described above, it takes an enormous time to carry out flushing to remove a liquid adhering, in particular, to the blow nozzle 104, upon so-called set-up change where the pressurized medium is replaced by a different liquid or by air. In particular, the blow nozzle 104 is practically composed of a number of components, and thus requires the steps of disassembling→brushing (cleaning)→reassembling, and it takes a long period of time before starting the production using the subsequent pressurized fluid, leading to a problem of reduced productivity.

Under the aforementioned circumstances, a blow molding device, which uses a liquid as the pressurized medium, involves a technical problem of allowing the set-up change to a different kind of medium to be carried out in a short time, and has an object of providing a blow molding device capable of carrying out molding by means of a plurality of pressurized media with high productivity.

Solution to Problem

To solve the aforementioned problem, the disclosed blow molding device includes as a main configuration: a mold for blow molding; a blow nozzle tightly communicating to a mouth tubular part of a preform in a bottomed cylindrical shape when fitted in the mold; and a stretch rod inserted in the axial direction through the blow nozzle, the blow molding device imparting shape to a container by longitudinally stretching the preform by means of the stretch rod while stretching the preform into an expanded state by means of a pressurized liquid fed, via a blow nozzle, from a pressurized liquid feeding part separately disposed, in which: the blow nozzle has a support part for supporting the posture of the stretch rod, and a filling head part communicating to the mouth tubular part of the preform, the filling head part having a feed channel formed therein in the axial direction; and the support part and the filling head part are configured to be detachably coupled to each other in the vertical direction.

According to the configuration described above, the blow nozzle composed of a number of components is divided in the vertical direction into a support part and a filling head part, the support part being disposed in a portion where a liquid as the pressurized medium do not touch and supporting the posture of the stretch rod, the filling head part having a liquid feed path formed therein where the liquid adheres and remains, such that the filling head part is configured as a so-called replaceable cartridge type, so that, in the set-up change of changing to a different kind of medium, the filling head part that has been used until then may be taken out so as to be replaced with another filling head part for a different kind of medium separately prepared, to thereby start, in a short time, the blow molding that uses the subsequent different kind of medium.

Then, the removed filling head part may be subject to the steps of disassembling→washing→reassembling so as to be ready for the subsequent production. In the step of washing as well, as compared with the conventional device which has the support part and the filling head part integrally formed, the subject to be washed is compact and limited to the filling head part, which allows the number of components to be reduced, and also the washing itself to be carried out in a separate step as well, to thereby effectively carry out the washing. In addition, the feed channel formed by the filling head part can be made shorter and simply configured without impairing the liquid in terms of its flowability, rectifying property, and ability of filling the preform, so as to reduce the contact area with the liquid and parts where the liquid is retained, to thereby further reduce the time it takes to wash the filling head part.

According to another one of the disclosed configurations to solve the aforementioned problem, the device further includes, in the aforementioned main configuration, a valve mechanism disposed on the downstream side end of the feed channel in the filling head part, in which the blow molding device is configured to allow, by means of the valve mechanism in the closed state, a liquid to circulate between the feed channel and the pressurized liquid feeding part and also to allow, by means of the valve mechanism in the open state, the liquid to be fed as being pressurized into the preform via the feed channel.

According to the device configured as described above, of all the steps of blow molding starting from the step of setting the preform in the mold to the step of removing the shaped container from the mold, in the steps other than the step of imparting shape to the container by feeding, via the feed channel, the pressurized liquid into the preform, the liquid employed as the pressurized medium can be circulated constantly or as required, between the feed channel and the pressurized liquid feeding part so as to be adjusted to a predetermined temperature, which allows for highly precise control of the temperature of the liquid to be fed into the preform, to thereby achieve stable shaping of the container under a fixed temperature condition.

Here, a configuration having a liquid circulation mechanism configured as described above attached thereto requires: disposing a valve mechanism; and providing a circulation route between the feed channel and the pressurized liquid feeding part, which not only increases the number of components in the blow nozzle but also complicates the internal configuration thereof, with the result that the time required for the washing thereof is increased. Therefore, in the devices provided with such circulating function, the operation and effect to be exerted by having the filling head part configured as a cartridge type in the aforementioned main configuration will be extremely effective.

According to still another one of the disclosed configurations to solve the aforementioned problem, the device configured as having the aforementioned circulating function further includes a liquid circulating part for feeding the pressurized liquid feeding part with a liquid adjusted to a predetermined temperature, in which the feed channel communicates, in an openable and closable manner, with the pressurized liquid feeding part via an introductory route disposed on the upstream side end of the feed channel, and while communicating on the downstream side thereof, in an openable and closable manner, with the liquid circulating part via a discharge path disposed on the upstream side position of the valve mechanism, and the blow molding device is configured to allow, by means of the valve mechanism in the closed state, the liquid to circulate between the feed channel and the pressurized liquid feeding part via the liquid circulating part.

According to yet another one of the disclosed configurations to solve the aforementioned problem, the device further includes, in the aforementioned main configuration, a seal body in a rod shape obtained by slidably inserting the stretch rod into a cylindrical rod-shaped shaft body, in which: the seal body is movably inserted into the blow nozzle in the axial direction, so that the blow molding device is configured to be capable of putting the feed channel into the closed state through abutment of the tip end of the seal body against a seal step formed on an inner circumferential surface of the filling head part; and the valve mechanism is configured through abutment and release of abutment of the tip end of the seal body against the seal step.

The configuration described above relates to the valve mechanism for opening and closing the feed channel inside the filling head part, in which the moving operation of a rod-shaped seal body movably inserted and disposed in the axial direction of the blow nozzle allows the feed channel to be opened and closed with ease. Further, in the event of using, as the pressurized liquid, beverages, cosmetics products, chemicals or the like, which are to be eventually filled into the final product, and manufacturing products finally filled with those liquids, it is necessary to adjust with high accuracy, simultaneously with the shaping thereof, the headspace to a predetermined amount in a container filled with a content liquid. In this regard, in the configuration described above, the valve mechanism for stopping the feeding of the liquid is disposed within the filling head part, and thus this valve mechanism may also be disposed immediately above the mouth tubular part of the preform, which allows for reducing the amount of liquid remaining in the feed channel part starting from immediately below the valve mechanism to the upper end of the mouth tubular part of the preform, so as to measure the liquid at high accuracy, to thereby control the head space with higher accuracy.

According to further one of the disclosed configurations, the device further includes, in the aforementioned main configuration, in exchange of the filling head part for the liquid, a separately-provided filling head part for air blow in a manner as being coupled to the support part, so that the blow molding device is configured to be capable of stretching the preform into an expanded shape by means of air blowing.

According to still further one of the disclosed configurations to solve the aforementioned problem, the device further includes, in the aforementioned main configuration, in exchange of the filling head part for the liquid, a separately-provided filling head part for another pressurized liquid in a manner as being coupled to the support part, so that the blow molding device is configured to be capable of stretching the preform into an expanded shape by means of another pressurized liquid different in type from the liquid previously used.

Advantageous Effect

The blow molding device disclosed herein is configured as described above. According to the device having the main configuration disclosed herein, the blow nozzle including a number of components is divided in the vertical direction into a support part and a filling head part, the support part being disposed in a portion where a liquid as the pressurized medium do not touch and supporting the posture of the stretch rod, the filling head part having a liquid feed path formed therein where the liquid adheres and remains, such that the filling head part is configured as a so-called cartridge type, to thereby carry out, in a short time, the set-up change to a different type of medium, so as to provide a blow molding device capable of carrying out molding by means of a plurality of pressurized media with high productivity Further, the removed filling head part may be disassembled→washed→and reassembled as required so as to be ready for a subsequent production. In the step of washing as well, as compared with the conventional device which has the support part and the filling head part integrally formed, the subject to be washed is compact and limited to the filling head part, which allows the number of components to be reduced, and also the washing itself can be carried out in a separate step as well, to thereby effectively carry out the washing.

DETAILED DESCRIPTION

Figure 1:
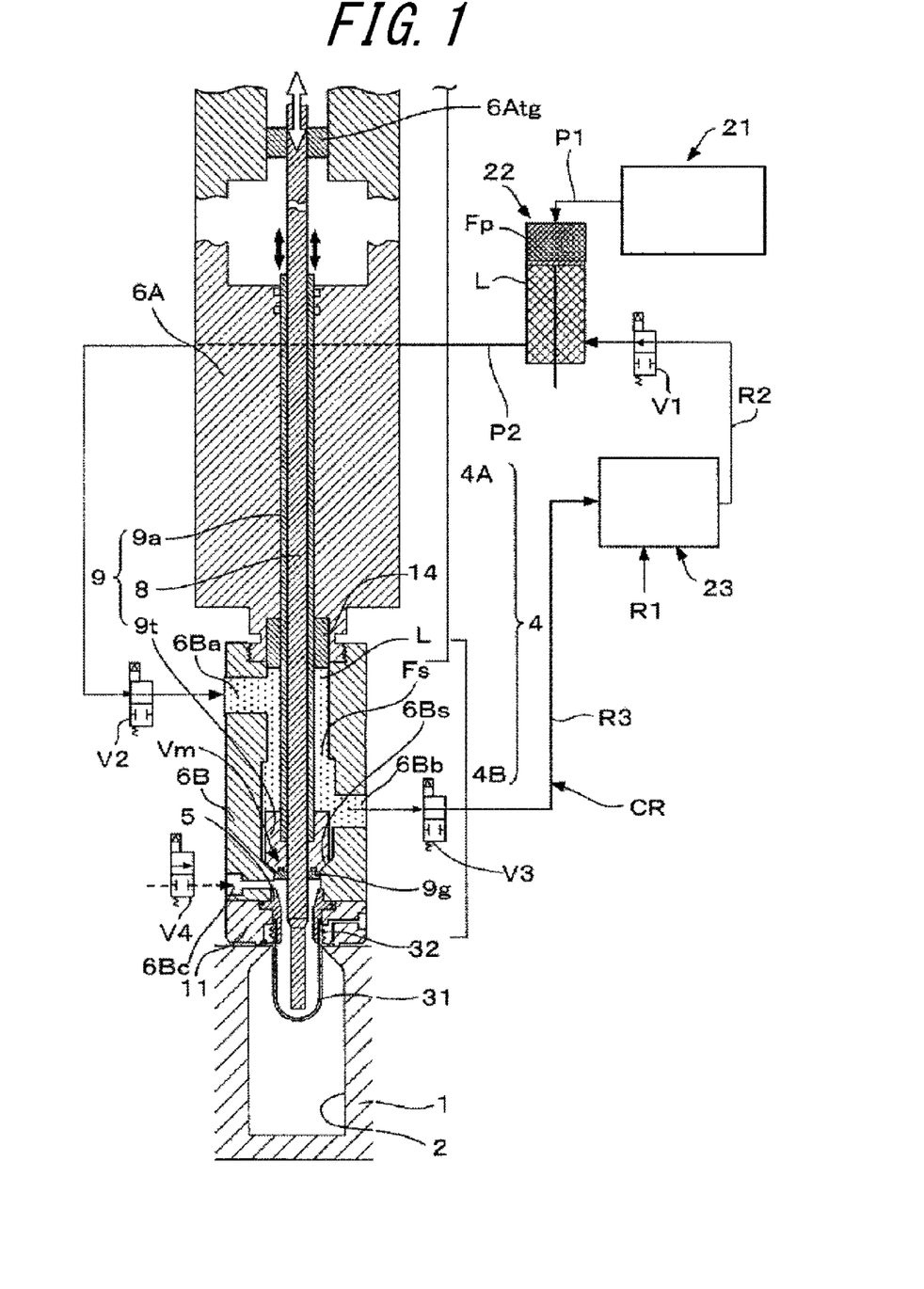
FIG. 1 is an explanatory diagram illustrating one example of the overall configuration of a blow molding device disclosed herein.
Figure 2:
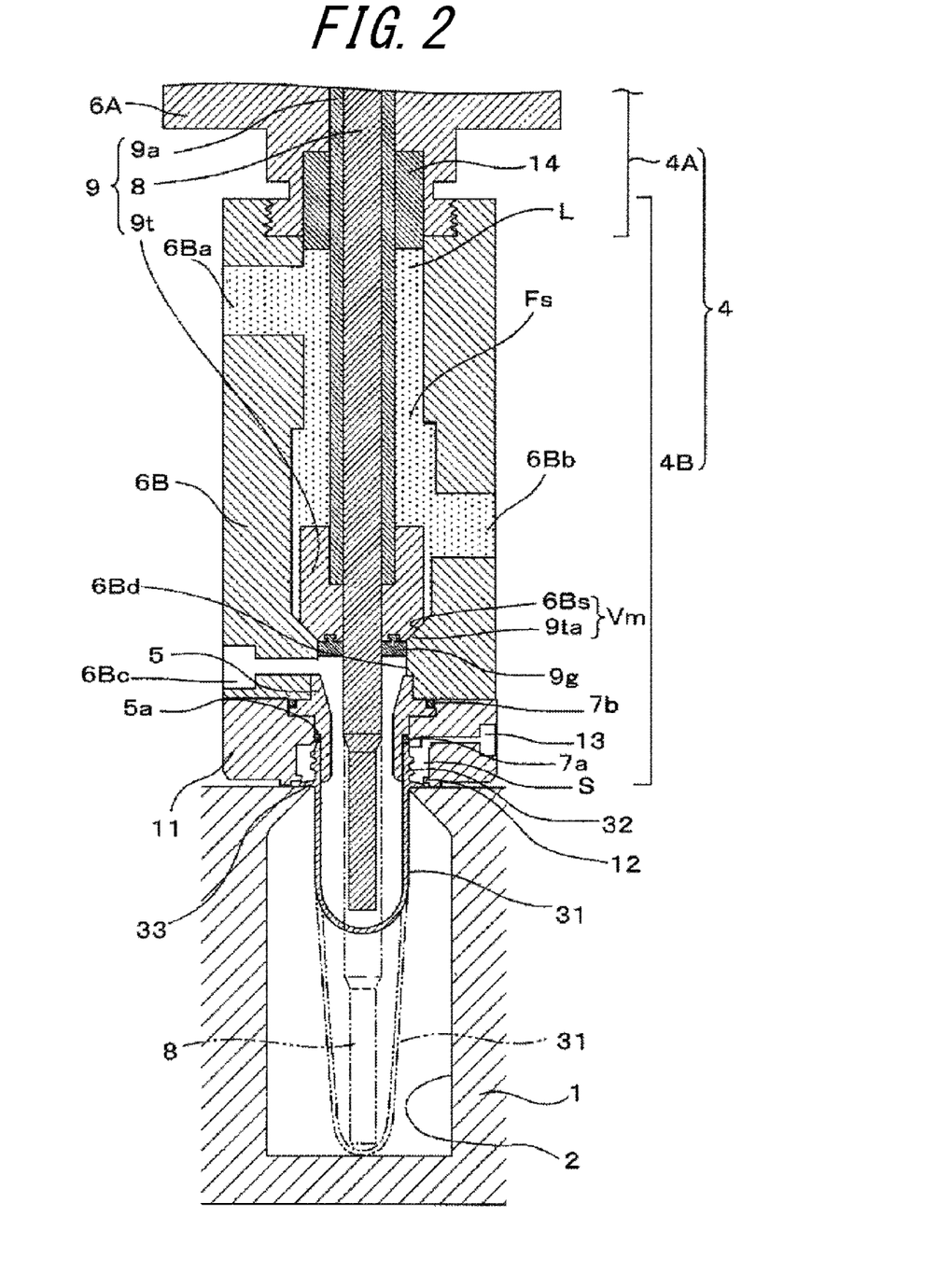
FIG. 2 is an enlarged sectional view of the vicinity of a filling nozzle part of the device of FIG. 1.

Hereinafter, embodiments of this disclosure are explained with reference to the accompanying drawings. FIGS. 1 to 4 are for illustrating one embodiment of the blow molding device disclosed herein, and also for illustrating a blow molding method using the device. Firstly, the overall configuration of the device is explained with reference to FIGS. 1 and 2, where FIG. 1 is an explanatory diagram illustrating an overall configuration of the blow molding device disclosed herein, and FIG. 2 is a longitudinal sectional view showing an enlargement of the vicinity of a filling head part 4B in the main part of the device of FIG. 1. Detailed components are described with reference to FIG. 2.

FIGS. 1 and 2 each illustrate a preform 31 installed into a mold 1, and show how the tip end of a blow nozzle 4 is fitted into a mouth tubular part 32 of the preform 31. The preform 31 to be used is in a bottomed cylindrical test tube shape, and has a mouth tubular part 32 installed upright in the upper end portion thereof. The mouth tubular part 32 has a neck ring 33 disposed on the lower end portion thereof, and the preform is installed into the mold 1 with the mouth tubular part 32 projecting outside (upward in FIGS. 1 and 2).

The main part of the disclosed device includes the mold 1 and the blow nozzle 4, and disposed as annex are a pressurizing device 21, a pressurized liquid feeding part 22, and a liquid circulating part 23. The blow nozzle 4 is generally tubular in shape, and includes: a support part 4A for supporting the posture of a stretch rod 8 and a seal body 9 to be described later; and a filling head part 4B having a feed channel Fs formed therein in the axial direction thereof for feeding the liquid L to the preform 31 and communicating, at the lower end thereof, with the mouth tubular part 32 of the preform 31. The support part 4A and the filling head part 4B are detachably coupled to each other in the vertical direction in a fluid-tight manner by means of a seal member 14. In this embodiment, the support member 4A and the filling head part 4B are screwed together so as to be detachably coupled and fixed to each other in such a manner that the lower end portion of the support part 4A is fitted into the upper end portion of the filling head part 4B.

The support part 4A has a support tube 6A having the seal body 9 and the stretch rod 8 inserted therethrough along the central axial direction, and an top rod guide 6Atg disposed in the upper portion of the support tube 6A to serve as a guide of the stretch rod 8.

On the other hand, the filling head part 4B is configured by including: a head tube 6B having the feed channel Fs formed therein; an tube fitting piece 5 tightly coupled to the head tube 6B via the seal member (O ring) 7b; and a partition member 11. The tube fitting piece 5, as illustrated in FIG. 2, has a peripheral step 5a installed around on the peripheral wall thereof, the peripheral step 5a being reduced in diameter toward the tip end, so that the cylindrical tip end portion thereof is fit into the mouth tubular part 32 of the preform 31 and the peripheral step 5a abuts against the upper end surface of the mouth tubular part 32 via the seal member (O ring) 7a, to thereby allow the filling head part 4B and the mouth tubular part 32 to be tightly coupled to each other in the communication manner.

The partition member 11 is disposed above the mold 1 so as to surround, via a space S, the outer peripheral surface of the mouth tubular part 32 of the preform 31 protruding upward from the mold 1, as illustrated in FIG. 2. If necessary, the partition member 11 may have a vent hole 13 disposed therein for feeding a pressurized gas into the space S. The partition member 11 may be provided with a support flange piece 12 which surrounds the lower end portion of the partition member 11, so as to have the support flange piece 12 abut from above against a neck ring 33 of the preform 31, to thereby retain the installation posture of the preform 31.

The head tube 6B is generally a tube-shaped member having a columnar hollow portion. As illustrated in FIGS. 1 and 2, the head tube 6B has, in the upper end thereof, an introductory route 6Ba of the liquid L disposed as penetrating through the peripheral wall, and a discharge path 6Bb of the liquid L disposed in the lower end thereof which also penetrates through the peripheral wall. Further below discharge path 6Bb, a seal step 6Bs is circumferentially provided on the inner peripheral surface of the lower end portion of this head tube 6B. The seal step 6Bs is inclined so as to reduce in diameter downwards, and a reduced-diameter part 6Bd is disposed immediately below the seal step 6Bs. Disposed below this seal step 6Bs is a vent hole 6Bc for communication between the outside and the inside of the head tube 6B.

An elongated rod shaped seal body 9 is disposed as being inserted in the axial direction (the vertical direction in FIG. 1) through the blow nozzle 4 configured by including the support part 4a and the filling head part head 4B as described above. This seal body 9 is formed by including: a metallic shaft body 9a in an elongated cylindrical rod-shape configured by having, in the lower end portion, a seal tube piece 9t in a short cylindrical shape which is coaxially fitted and assembled thereto; a short tube shaped rod guide 9g made of a polyether ether ketone (PEEK) resin which is coaxially coupled to the lower end of the seal tube piece 9t; and the stretch rod 8 in a columnar shape inserted through the shaft body 9a and the rod guide 9g. Here, from the perspective of wear resistance and slippage, the stretch rod 8 is inserted through the shaft body 9a with a small gap there between, while the stretch rod 8 is slidably inserted through the rod guide 9g as being circumferentially contacting therewith.

Now, the stretch rod 8 is slidably inserted through the top rod guide 6Atg as being circumferentially contacting therewith in the upper end portion of the support tube 6A constituting the support part 4A (see FIG. 1). The outer peripheral edge of the lower end surface of the seal tube piece 9t is chamfered to form a tapered edge 9ta. The rod guide 9g is disposed so as to be capable of being slidably inserted into and removed from the reduced-diameter part 6Bd of the filling head part 4B.

Figure 3:
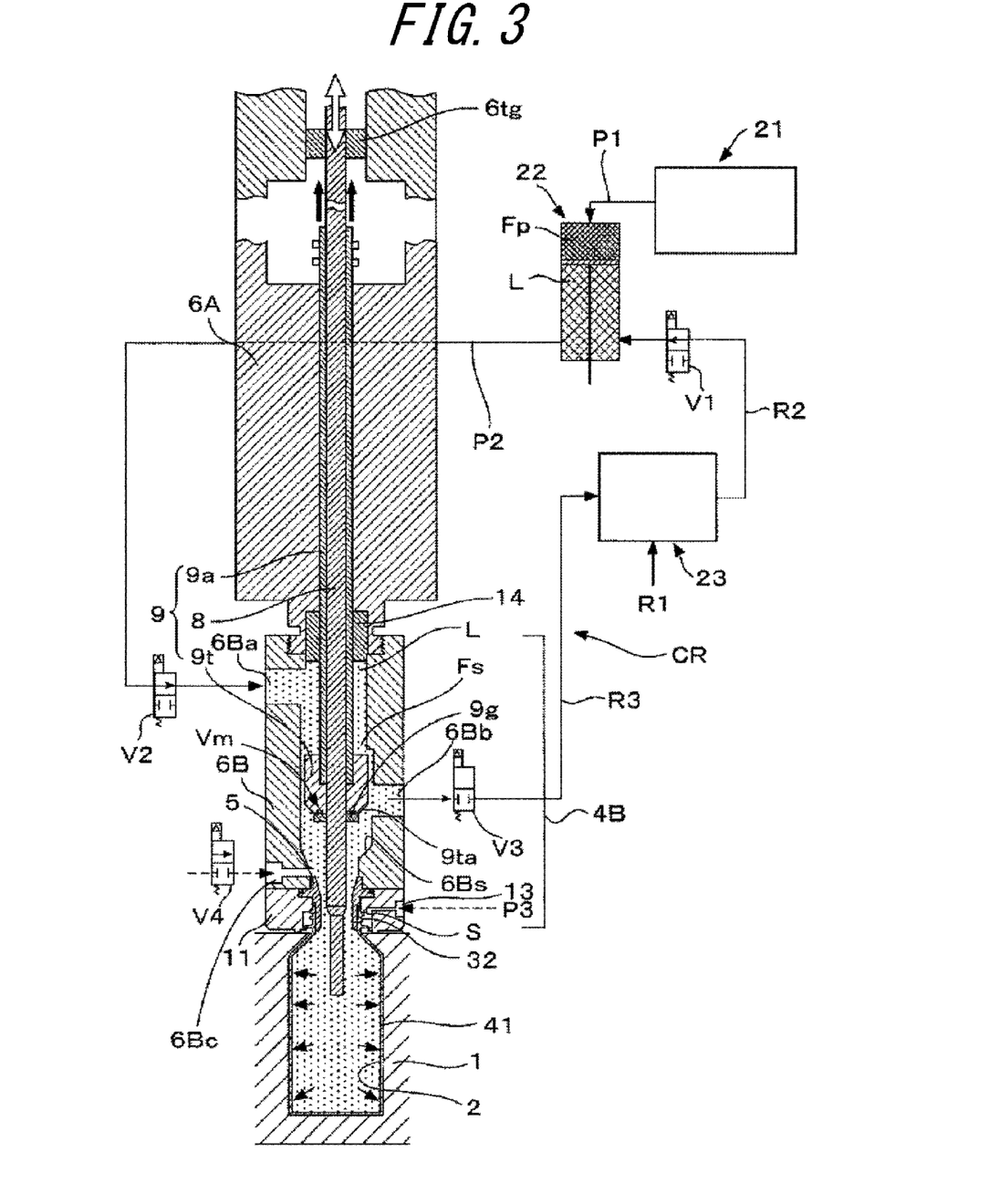
FIG. 3 is a sectional view illustrating, in the molding steps of the device of FIG. 1, a state of a container which is shaped by longitudinally stretching a preform of FIG. 2 and then stretching, by means of a pressurized liquid, the longitudinally-stretched preform into an expanded state.

Then, the filling head part 4B and the seal body 9 form the feed channel Fs in a cylindrical shape communicating into the preform 31, within the filling head part 4B, along the axial direction of the filling head part 4B. The seal body 9 may be descended, so as to have the tapered edge 9ta of the seal tube piece 9t to abut against the seal step 6s circumferentially disposed on the inner peripheral surface in the lower end portion of the head tube 6B as illustrated in FIGS. 1 and 2, to thereby close the communication of the feed channel Fs into the preform 31. Meanwhile, the seal body 9 may be ascended as illustrated in FIG. 3 so as to open the communication. The aforementioned abutment and detachment of the tapered edge portion 9ta against the seal step 6Bs constitute the valve mechanism Vm.

With the valve mechanism Vm in the closed state, the rod guide 9g is fitted into the reduced-diameter portion 6Bd immediately below the seal step 6Bs of the head tube 6B, while with the valve mechanism Vm in the open state, the rod guide 9g is removed upward from the reduced-diameter portion 6Bd, which opens the flow channel of the liquid L.

Next, as to the annex, the pressurizing device 21 has been essential in the conventional blow molding, and is a large-scale piece of equipment such as a pressure pump or a compressor. The pressurized fluid Fp fed from the pressurizing device 21 via the piping P1 becomes the power source for driving the pressurized liquid feeding part 22 in the form of a plunger pump feeding the pressurized liquid L. As the pressurized liquid feeding part 22, there may be employed, other than the plunger illustrated in the form of pump, a cylinder and the like incorporating a piston having two chambers.

Further, in the device of this embodiment, the liquid circulating part 23 is disposed, so as to newly feed the liquid L from piping R1 while adjusting the liquid L to a predetermined temperature and feeding the liquid L to the pressurized liquid feeding part 22 via the piping R2, and also to circulate the liquid L, while adjusting the liquid L to a predetermined temperature, between the pressurized liquid feeding part 22 and the feed channel Fs in the filling head part 4B. In other words, when the valve mechanism Vm is in the closed state as illustrated in FIG. 1, the device is configured to circulate, as necessary, the liquid L in the circulation route CR which is configured by including: the feed channel Fs→the discharge path 6Bb→the piping R3→the liquid circulating part 23→the piping R2→the pressurized liquid feeding part 22→the piping P2→the introductory route 6Ba→the feed channel Fs, in the stated order. The aforementioned circulating function may be disposed as an annex to the device, so as to control with high precision the temperature of the liquid L to be fed into the preform 31, to thereby stabilize the quality of containers 41 to be shaped, enabling higher productivity.

Next, with reference to FIGS. 1 to 4, description is given of one example of the steps of blow molding a synthetic resin container using the blow molding device described above. The following steps (1) to (7) are sequentially carried out so as to implement blow molding.

(1) First, the preform 31 is heated, except for the mouth tubular part 32 thereof, to an appropriate temperature for blow molding, and is inserted into and clamped on the mold 1 for blow molding, with the mouth tubular part 32 protruding upwards.

(2) Next, the blow nozzle 4 in which the support part 4A and the filling head part 4B are coupled and fixed to each other is descended from above the mouth tubular part 32, so as to have the tip end of the tube fitting piece 5 fitted into the mouth tubular part 32 to be in the state illustrated in FIGS. 1 and 2. Here, the tapered edge 9ta of the seal tube piece 9t forming the lower end portion of the seal body 9 abuts against the seal step 6Bs of the head tube 6B and thus the valve mechanism Vm is in the closed state, with the stretch rod 8 being inserted into the preform 31. The valves V1, V2 and V3 are all in the open state, and the liquid L circulates in the circulation route CR described above while being adjusted in temperature by the liquid circulating part 23.

(3) Next, the preform 31 is longitudinally stretched by means of the stretch rod 8, as illustrated by the double dotted lines in FIG. 2. In this longitudinal stretch step, the posture of the stretch rod 8 is firmly supported by the top rod guide 6Atg disposed on top of the support tube 6A and by the rod guide 9g supported on the reduced-diameter part 6Bd of the head tube 6B, and thus the longitudinal stretch of the preform 31 can be implemented stably in a state with no core slide or core deviation. Here, this embodiment is configured to longitudinally stretch the preform 31 until the bottom wall of the preform abuts against the bottom wall of the mold 1. However, the device may be configured to longitudinally stretch the preform 31 to an intermediate height, in consideration of the productivity of the blow molding, and the wall thickness distribution of the container 41 to be shaped.

(4) Next, from the state where the preform is longitudinally stretched as illustrated in FIG. 2, the shaft body 9a is ascended as illustrated in FIG. 3 so as to put the valve mechanism Vm into the open state, while putting the valves V1 and V3 into the closed state, so as to stop the circulation of the liquid L along the circulation route CR, and the pressurized liquid L to be fed from the pressurized liquid feeding part 22 is fed, via the feed channel Fs in the filling head part 4B, into the preform 31 from the mouth tubular part 32 so as to stretch the preform 31 into an expanded state along the shape of the cavity 2 of the mold 1, to thereby impart shape to the container 41. Note that, in the event that the mouth tubular part 32 is subject to diameter expansion distortion under the pressure of the liquid L, a pressurized gas is introduced via piping P3 into the partition member 11 from the vent hole 13 disposed in the partition member 11, so as to pressurize the space S continuously surrounding the outer peripheral surface of the mouth tubular part 32, to thereby effectively suppress such diameter expansion distortion.

Figure 4:
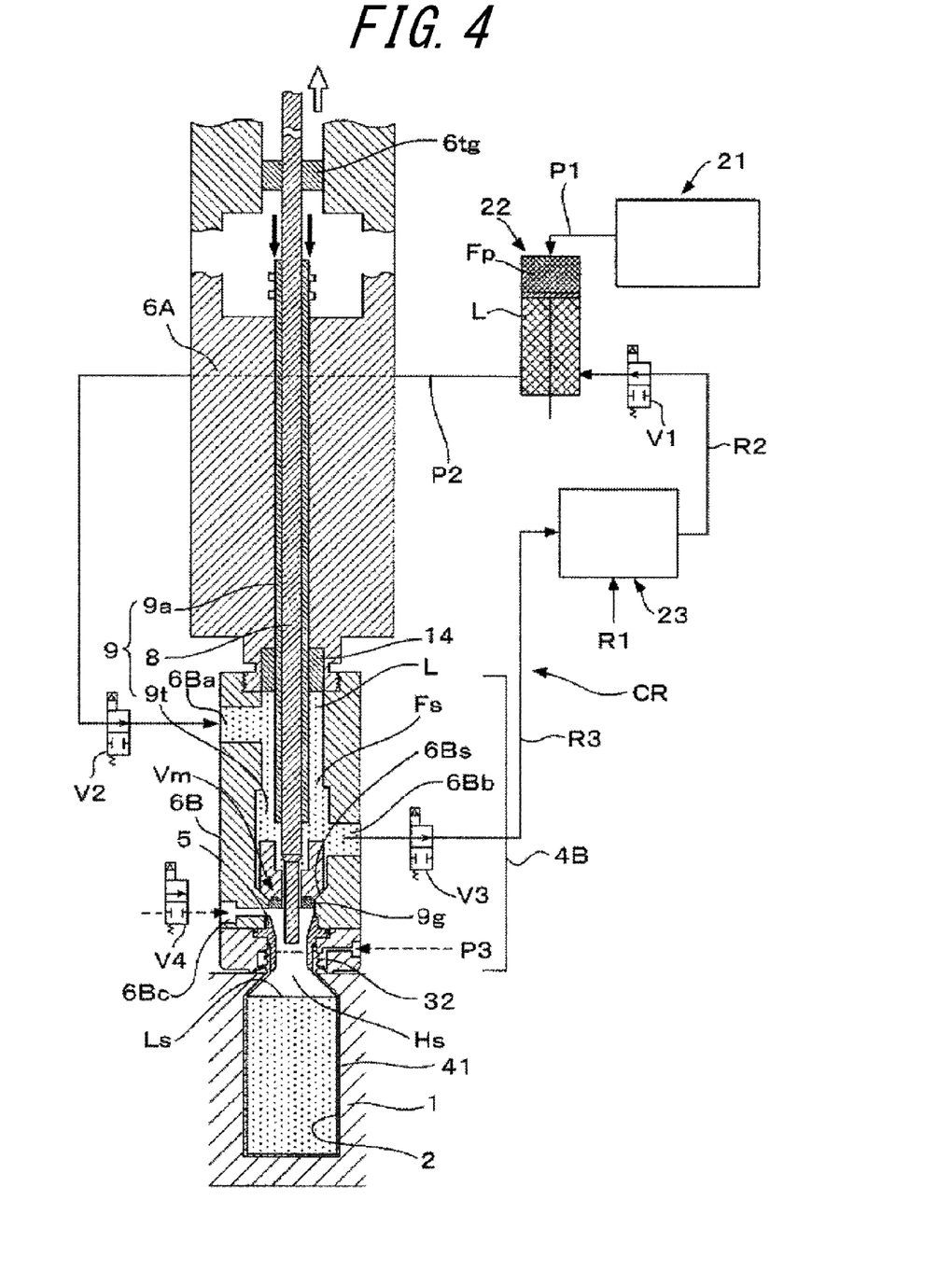
FIG. 4 is a sectional view illustrating, in the molding steps of the device of FIG. 1, a state where the stretch rod has been removed out of the container from the state of FIG. 3.

(5) Next, after the container 41 is shaped as described above, the shaft body 9a is descended as shown in FIG. 4 to put the valve mechanism Vm into the closed state while putting the valves V1, V2 and V3 into the open state, to thereby circulate again the liquid L along the circulation route CR.

(6) At the same time as the step (5), or slightly thereafter, the tip end of the stretch rod 8 is removed from the container 41, as illustrated in FIG. 4. Here, along with the removal of the tip end of the stretch rod 8, all of the liquid L remaining below the valve mechanism Vm in the feed channel Fs flows into the interior of the container 41. Then, the liquid surface Ls in the container 41 lowers, allowing for adjustment to a predetermined headspace Hs set in advance, as illustrated in FIG. 4. Note that, at the time of removal of the tip end of the stretch rod 8, if the container 41 enters a vacuum state, causing the container 41 to deform as if reduced in capacity, the vent hole 6Bc disposed in the head tube 6B of the filling head part 4B may be put into the open state by means of the valve V4, to thereby alleviate the vacuum state in the container 41, which allows for effectively preventing such deformation of the container 41.

Here, in the configuration described above of this Example, the valve mechanism Vm for stopping the feeding of the liquid L is disposed in the vicinity of the lower end portion of the filling head part 4B, and thus the amount of the liquid L remaining in a part of the feed channel Fs, the part being defined from the position where the valve mechanism Vm is disposed to the upper end of the mouth tubular part 32 of the preform 31, can be reduced and thus can be measured with high precision, allowing for controlling the headspace Hs with high higher precision.

(7) While omitted from the drawings, the mouth tubular part 32 of the container 41 is then removed from the tube fitting piece 5, and the mold 1 is opened up and the container 41 filled with the liquid L is extracted, and the mouth tubular part 32 is cap sealed, so as to produced the container 41 as a product.

Figure 5:
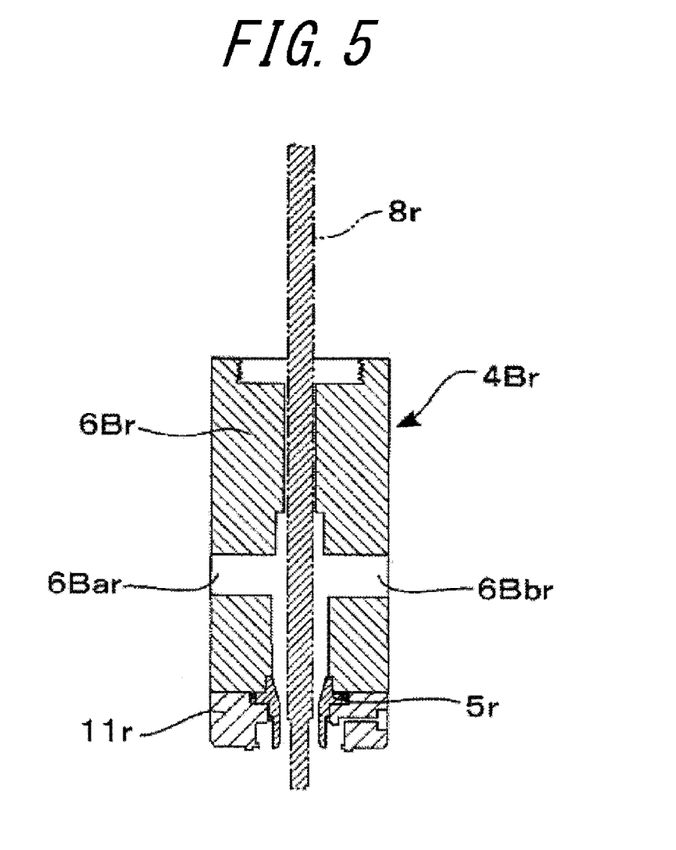
FIG. 5 is a sectional view illustrating one example of the filling head part for air blowing.

Next, in a blow molding device that uses the liquid L as a pressurized medium as described above, description is given of an example of the set-up change when carrying out blow molding by replacing the pressurized liquid with a different kind of fluid. Illustrated this time is the set-up change to be carried out when changing the pressurized medium from a liquid to air. FIG. 5 is a longitudinal sectional view of a filling head part 4Br for air blow, which is to be coupled to the lower end portion of the support part 4A, in place of the separately-provided filling head part 4B of FIG. 1. The filling head part 4Br is configured by including: a head tube 6Br; a tube fitting piece 5r; and a partition member 11r, and as compared with the head tube 6B for use on liquids, the head tube 6Br is simpler in shape, having an introductory route 6Bar and a discharge path 6Bbr for air, both penetrating through the tube wall.

Figure 6:
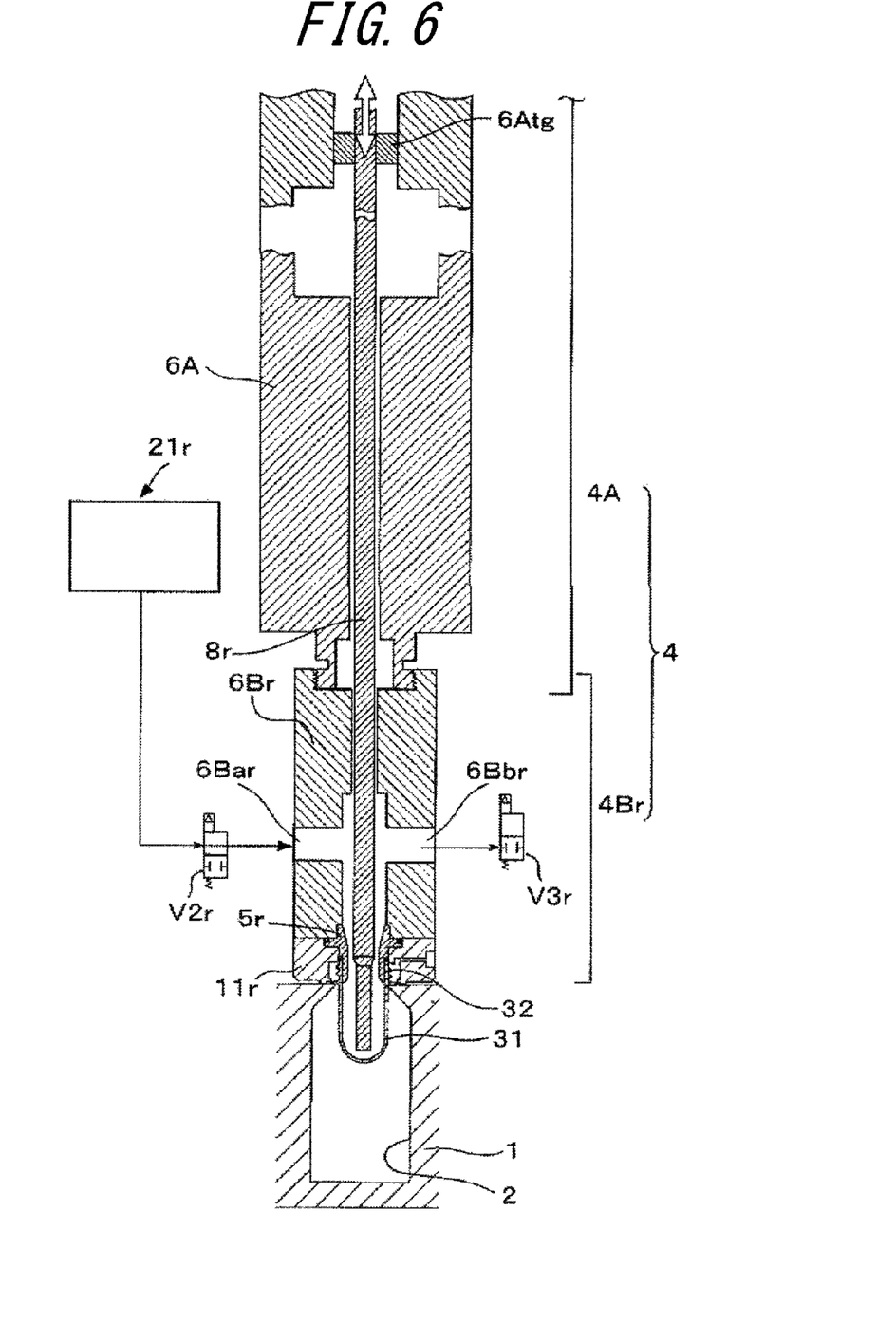
FIG. 6 is an explanatory diagram illustrating a blow molding device installed with the filling head part for air blowing of FIG. 5, in place of the filling head part of FIG. 1.

In the set-up change, in the device illustrated in FIG. 1, the filling head part 4B is unscrewed from the support part 4a and detached therefrom, and in place thereof, the aforementioned filling head part 4Br for air blow is coupled and fixed to the lower end portion of the support part 4A by means of screwing thereto. FIG. 6 illustrates an overview of the device having the filling head part 4Br, in place of the filling head part 4B of FIG. 1, is coupled and fixed to the support part 4A of FIG. 1 as described above, in which a pressurized air is blown into the preform 31 from a pressurizing device 21r via a valve V2r and the introductory route 6Bar, in other words, by means of air blowing, so as to expand the preform 31 in a stretched shape, along with the longitudinal stretching by means of the stretch rod 8, to thereby impart shape to the container. Now, the stretch rod 8 is also replaced by a stretch rod 8r separately provided. The pressurizing device 21 illustrated in FIG. 1 may also be used in common with the pressurizing device 21r.

On the other hand, the filling head part 4B thus removed may be transferred to an appropriate location, and the steps of disassembling→washing→reassembling may be performed as required, so as to be ready for a subsequent production using a liquid as the pressurized medium. In the step of washing, flushing may be employed to remove a liquid adhering to and remaining in the filling head part 4B, where the subject to be washed is compact and limited to the filling head part 4B, which allows the number of components to be reduced, and also the washing itself can be carried out in a separate step as well, to thereby effectively carry out the washing step.

Figure 7:
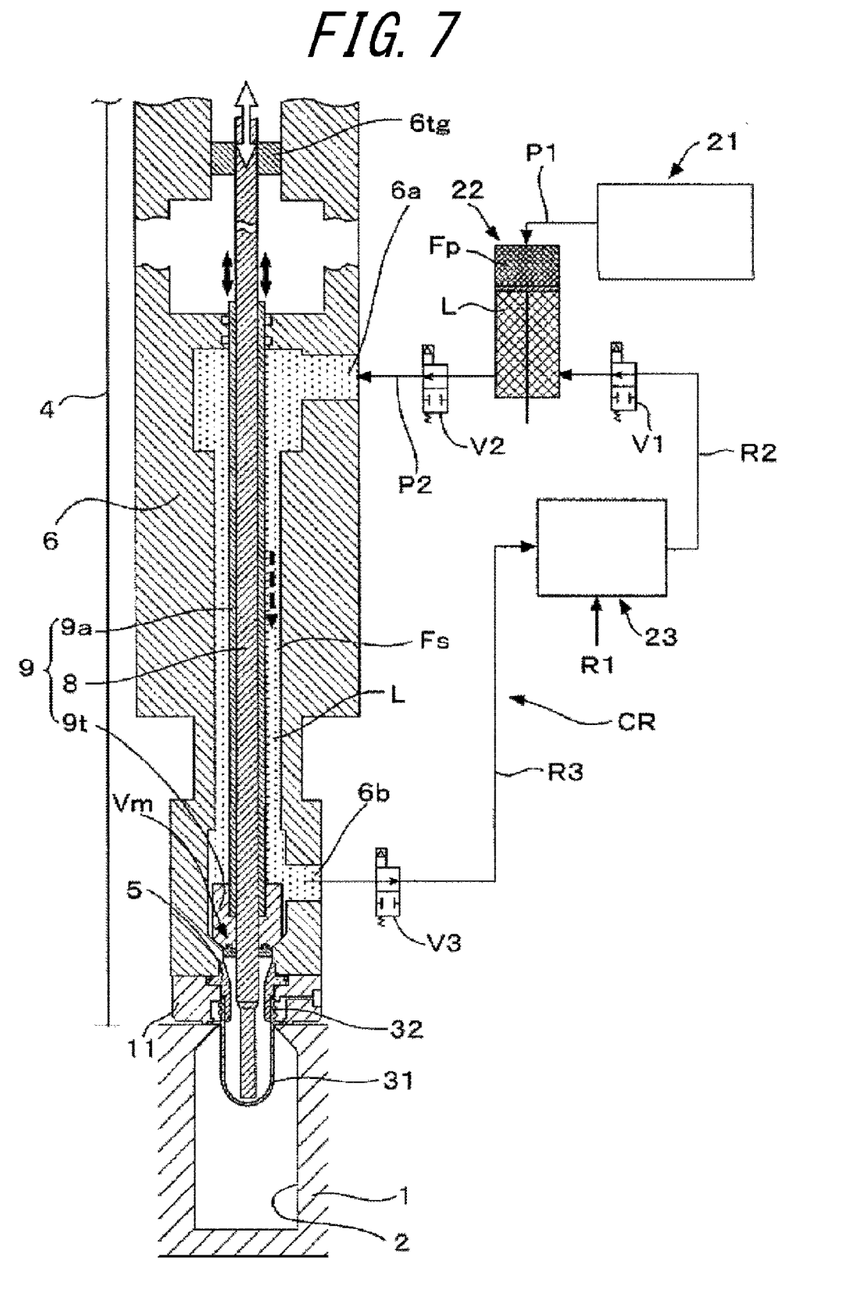
FIG. 7 is an explanatory diagram illustrating a blow molding device to serve as a comparative example of the blow molding device of FIG. 1.

Here, FIG. 7 is an explanatory diagram of a blow molding device, serving as a comparative example of the blow molding device of FIG. 1. The device according to the comparative example is similar to the device of FIG. 1 in that a liquid is used as the pressurized medium, and is substantially the same in function of the circulation mechanism of the liquid L, the valve mechanism Vm, the peripheral devices, and the like. However, in the device of the comparative example, the blow nozzle 4 is not divided into the support part 4A and the filling head part 4B, which are rather integrally formed. Then, the liquid L to be fed from the pressurized liquid feeding part 22 is fed into the preform 31 via the feed channel Fs from the introductory route 6a of the feed tube 6 constituting the blow nozzle 4. The liquid L may be circulated by means of the circulation route CR via the discharge path 6b.

However, if this device is employed to carry out blow molding by means of air blowing as described above, it will take an enormous time to carry out, upon the set-up change, the steps of disassembling→washing→reassembling the blow nozzle 4 in order to remove a liquid adhered to the inside of the blow nozzle 4, which requires a long time to start production by air blowing, to thereby reduce productivity.

Now, as can be appreciated by comparing the device of the embodiment represented in FIG. 1 with the device of the comparative example illustrated in FIG. 7, in the device of FIG. 1, when dividing the blow nozzle 4 into the support part 4A and the filling head part 4B, the length of the feed channel Fs to be formed in the filling head part 4B of the device of FIG. 1 is kept to minimum without impairing the liquid L in terms of its flowability, rectifying property, and ability of filling the preform 31, so as to make short the filling head part 4B, to thereby attain a compact configuration. Then, the filling head part 4B may be made compact as described above, so as to facilitate the change out operations of the filling head part 4B, and to more simplify the operations of disassembly→washing→reassembly.

The embodiments of the blow molding device disclosed herein have been described above based on the examples. However, the disclosed device is not limited in any way to the examples described above. In the examples described above, an explanation has been given of the set-up change where the pressurized medium is changed from a liquid to air, but the liquid as the medium may be replaced by a different kind of liquid. Further, the devices of the examples described above are configured to circulate the liquid L by means of the circulation route CR, but the devices may also be configured to have no such circulation mechanism. Further, the aforementioned examples are configured to feed the liquid L to the feed channel Fs via the introductory route 6Ba from the pressurized liquid feeding part 22, but this mode of feeding the liquid L may be selected as appropriate from among a variety of modes. The valve mechanism Vm may also be selected as appropriate from among a variety of modes.

Moreover, in the examples of the steps of blow molding using the disclosed device, the preform is first longitudinally stretched by means of the stretch rod and then the valve mechanism Vm is put into the open state so as to feed the pressurized liquid L into the preform 31. However, the feeding of the liquid L into the preform 31 may be carried out substantially simultaneously with the longitudinal stretch by means of the stretch rod 8. Further, in consideration of the adjustment of the headspace Hs, the ease of blow molding including the productivity, the presence or absence of reduced capacity deformation, and the presence or absence of residual distortion and the uniformity of the peripheral wall in the shaped container 41, there may be employed a method of keeping the stretch rod 8 lifted to a position of a predetermined height within the container 41 from the position where the stretch rod 8 finished the longitudinal stretch of the preform, at an appropriate timing, such as immediately before the shaping of the container 41 by means of the pressurized liquid L is completed.

INDUSTRIAL APPLICABILITY

As described above, according to the disclosed blow molding device, the set-up change of changing to a different medium can be carried out in a short period of time. Thus, from the perspective of improving productivity, the disclosed blow molding device is expected to be widely applicable in the field of blow molding using different kinds of pressurized liquids.

REFERENCE SIGNS LIST 1 mold
2 cavity
4 blow nozzle
4A support part
4B filling head part
5, 5r tube fitting means
5a peripheral step
6 feed tube
6A support tube
6Atg, 6tg top rod guide
6B, 6Br head tube
6a, 6Ba, 6Bar introductory route
6b, 6Bb, 6Bbr discharge path
6Bs seal step
6Bc vent hole
6Bd reduced-diameter part
7a, 7b seal member
8, 8r stretch rod
9 seal body
9a shaft body
9t seal tube piece
9ta tapered edge
9g rod guide
11, 11r partition member
12 support flange piece
13 vent hole
14 seal member
21, 21r pressurizing device
22 pressurized liquid feeding part
23 liquid circulating part
CR circulation route
Fs feed channel
HS headspace
L liquid
Ls: liquid surface
P1, P2, P3 piping
R1, R2 piping
S space
V1, V2, V2r, V3, V3r, V4 valve
Vm: valve mechanism
31 preform
32 mouth tubular part
33 neck ring
41 container
101 mold
102 cavity
104 blow nozzle
108 rod
121 pressurizing device
122 pressurized liquid feeding part
V101 valve

The invention claimed is:

1. A blow molding device having:
mold for blow molding;
a blow nozzle tightly communicating to a mouth tubular part of a preform in a bottomed cylindrical shape when fitted in the mold;
a stretch rod inserted in the axial direction through the blow nozzle, the blow molding device imparting shape to a container by longitudinally stretching the preform by means of the stretch rod while stretching the preform into an expanded shape by means of a pressurized liquid fed, via the blow nozzle, from a pressurized liquid feeding part separately provided;
in the filling head part, a valve mechanism disposed on the downstream side end of the feed channel so as to be capable of opening and closing the feed channel, wherein:
the blow nozzle has a support part for supporting the posture of the stretch rod, and a filling head part communicating to the mouth tubular part of the preform, the filling head part having a feed channel formed therein in the axial direction and an introductory route of the liquid to the feed channel;
the support part and the filling head part are configured to be detachably coupled to each other in the vertical direction; and
the blow molding device is configured to allow, by means of the valve mechanism in the closed state, the liquid to circulate between the feed channel and the pressurized liquid feeding part and also to allow, by means of the valve mechanism in the open state, the liquid to be fed as being pressurized into the preform via the feed channel.

2. The blow molding device claimed in claim 1, further comprising a liquid circulating part for feeding the pressurized liquid feeding part with the liquid adjusted to a predetermined temperature, wherein:
the feed channel communicates, in an openable and closable manner, with the pressurized liquid feeding part via an introductory route disposed on the upstream side end of the feed channel of the filling head part while communicating on the downstream side thereof, in an openable and closable manner, with the liquid circulating part via a discharge path disposed on the upstream side position of the valve mechanism; and
the blow molding device is configured to allow, by means of the valve mechanism in the closed state, the liquid to circulate between the feed channel and the pressurized liquid feeding part via the liquid circulating part.

3. The blow molding device claimed in claim 1, further comprising a seal body in a rod shape obtained by slidably inserting the stretch rod into a cylindrical rod-shaped shaft body, wherein:
the seal body is movably inserted into the blow nozzle in the axial direction, so that the blow molding device is configured to be capable of putting the feed channel into the closed state through abutment of the tip end of the seal body against a seal step formed on an inner circumferential surface of the filling head part; and
the valve mechanism is configured through abutment and release of abutment of the tip end of the seal body against the seal step.

4. The blow molding device claimed in claim 1, further comprising, in exchange of the filling head part for the liquid, a filling head part separately prepared for air blow, the filling head part being coupled to the support part, so that the blow molding device is configured to be capable of stretching the preform into an expanded shape by means of air blowing.

5. The blow molding device claimed in claim 1, further comprising, in exchange of the filling head part of the liquid, a filling head part for another pressurized liquid separately prepared which is coupled to the support part, so that the blow molding device is configured to be capable of stretching the preform into an expanded shape by means of the pressurized liquid different in type from the liquid previously used.

* * * * *